United States Patent [19]

James et al.

[11] 3,991,280
[45] Nov. 9, 1976

[54] MONOBUS VARIABLE RESISTANCE TRANSMISSION CIRCUIT

[75] Inventors: Dennis Bryan James, Rumson; Chao Kai Liu, Matawan; Robert McKee Smith, Holmdel, all of N.J.

[73] Assignee: Bell Telephone Laboratories, Incorporated, Murray Hill, N.J.

[22] Filed: May 23, 1975

[21] Appl. No.: 580,293

[52] U.S. Cl. .......................... 179/18 BC; 179/1 CN
[51] Int. Cl.² .......................................... H04M 3/56
[58] Field of Search .............. 179/1 CN, 18 BC, 99, 179/170 R, 170 NC

[56]     References Cited
        UNITED STATES PATENTS

| 3,534,175 | 10/1970 | Schultz | 179/18 BC |
| 3,668,289 | 6/1972 | Fenton | 179/1 CN |
| 3,818,139 | 6/1974 | Snyder | 179/1 CN |
| 3,824,344 | 7/1974 | James et al. | 179/1 CN |
| 3,828,146 | 8/1974 | Lewis | 179/18 BC |
| 3,891,801 | 6/1975 | Wang | 179/1 CN |
| 3,909,559 | 9/1975 | Taylor | 179/1 CN |

*Primary Examiner*—Kathleen H. Claffy
*Assistant Examiner*—Randall P. Myers
*Attorney, Agent, or Firm*—David H. Tannenbaum

[57] ABSTRACT

In order to reduce the signal loss in a telephone line switching and conferencing system there is interposed between each line and the switching matrix a monobus port circuit arranged to convert a transmitted telephone signal into an equivalent current source. The currents from several monobus circuits are added in a bus resistor before distribution back to the individual monobus circuit where the original signal is subtracted from the bus signal. The resultant signal is transmitted to the telephone receiver. When the switching matrix crosspoint resistance is negligible, the component of the bus voltage measured at the current source output which results from current generated from each line is equal and opposite in magnitude to the voltage generated in the line. In any given line these voltages cancel each other, thereby eliminating the feedback signal. In situations where it is desired to use crosspoints having an unknown resistance, the voltage returned from the monobus does not exactly match the locally generated voltage because of the voltage drop across the crosspoint and thus a feedback signal of unknown magnitude is applied to the telephone line. This unknown deviation of signal gives rise to gain contrast from one connection to the next and modifies the return loss in an unpredictable fashion. This problem has been solved by separating the connections of the monobus into transmit and receive paths and connecting each path to the bus through a separate crosspoint.

4 Claims, 2 Drawing Figures

MONOBUS VARIABLE RESISTANCE TRANSMISSION CIRCUIT

FIELD OF THE INVENTION

This invention relates to telephone conferencing and transmission systems and, more particularly, to a port circuit useful for reducing the signal loss on switching and conference connections.

BACKGROUND OF THE INVENTION

When three or more telephones are connected together in a conference connection with no special conferencing circuitry, a loss of signal strength is experienced compared with the signal strength in a typical two telephone connection. When the crosspoints of the switching matrix have no resistance, the loss is caused by the additional impedance load to which a transmitting telephone must supply signal power. When the crosspoints have a nonzero resistance, additional loss is caused by the power lost in transmission through the closed crosspoints. When the crosspoint resistance is a known, fixed value, loss can be eliminated by the use of a monobus circuit, which splits outgoing signals from incoming signals into current and voltage signals, respectively.

Such a monobus circuit is disclosed in the concurrently filed, copending patent application of D. J. Morgan and D. C. Smith Ser. No. 580,292, filed May 23, 1975 where the monobus interface circuit is interposed between each line and the switching matrix. The interface circuit is a current source arranged to provide the current equivalent of the voltage signal available from the transmission source. In the above-identified Morgan-Smith patent application, one bus resistor is supplied by the switching matrix and is shared in common by the monobus circuits serving the other connected transmission lines. In this manner the current signal generated by the port circuit current source is converted to a voltage signal by flowing through the common bus resistor and supplied via the switching matrix to each other connected port circuit.

When the switching matrix crosspoint resistance is negligible, the component of the bus voltage measured at the current source output which results from current generated from each line is equal and opposite in magnitude to the voltage generated in the line. In any given line these voltages cancel each other, thereby eliminating the feedback signal. In situations where it is desired to use crosspoints having variable resistance, the voltage returned from the bus resistor plus the crosspoint resistor does not exactly match the locally generated voltage and thus a feedback signal of unknown magnitude is applied to the telephone line, causing the return loss to be different than in the known or zero crosspoint resistance case, and the transmission loss to be modified due to the resultant feedback signal.

Thus, it is an object of our invention to provide a monobus hybrid port circuit for use with a variable resistance switching matrix where the crosspoint resistance does not affect the transmission signal levels.

SUMMARY OF THE INVENTION

Such a need has been met in an illustrative embodiment of our invention by separating the connections from the high impedance current source output to the monobus into transmit and receive paths and connecting each path to the bus resistor through a separate crosspoint. In this manner the returned voltage is more nearly the exact voltage on the bus and the crosspoint resistance variation, when compared to the high impedance summing resistor, is negligible.

Accordingly, it is a feature of our invention to arrange a monobus switching system with dual crosspoints at each port circuit for the purpose of eliminating the effect of crosspoint resistance and telephone set loading on a system of two or more telephone connections.

It is a further feature of our invention that by using a dual crosspoint arrangement with a monobus port circuit the gain contrast is reduced and the return loss is independent of crosspoint resistance variation.

BRIEF DESCRIPTION OF THE DRAWING

These and other objects and features will be more fully understood from a review of the drawing in which.

DETAILED DESCRIPTION

Review of Monobus Circuit Operation

Before beginning a discussion of our invention, it seems advisable to review briefly the operation of the monobus interface circuit which is the subject of the aforementioned Morgan-Smith patent application. This interface circuit is shown in FIG. 2.

In the following discussion the letter $i$ is used to designate the number of any particular port circuit. Thus, amplifier $Ai\text{-}1$ (shown in FIG. 2) associated with port circuit PC1 is the notation for amplifier $A1\text{-}1$. Similarly, the $Qi\text{-}1$ transistor associated with port circuit PC2 is shown in port circuit PC2 as transistor $Q2\text{-}1$.

Figure 2:
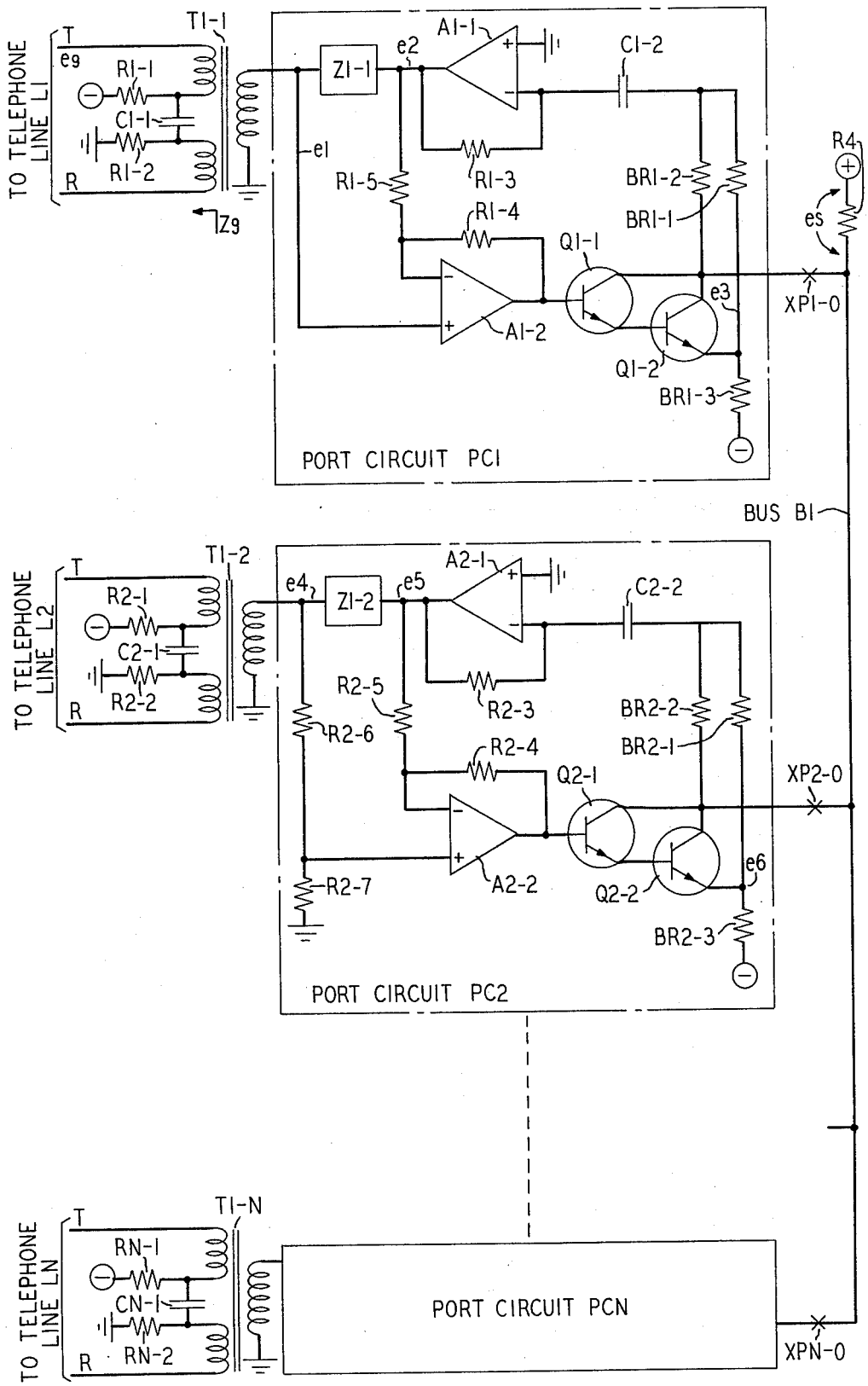
FIG. 2 shows a single crosspoint switching matrix of the type described in the aforementioned copending application of D. J. Morgan and D. C. Smith.

As shown in FIG. 2, each port circuit, in response to signal transmission voltage over the associated telephone line, such as telephone line L1, transmits a signal to bus B1 as a signal current from the current sources $Qi\text{-}1$ and $Qi\text{-}2$. The resultant signal voltage, shown as voltage $e_s$ on bus B1 is the sum of all signal currents multiplied by resistor R4. In each port circuit, amplifier $Ai\text{-}1$ subtracts the port circuit's own contribution to the bus signal from the bus signal $e_s$ and applies the result to the input of operational amplifier $Ai\text{-}2$. Operational amplifier $Ai\text{-}2$ along with associated components $Zi\text{-}1$, $Ri\text{-}5$ and $Ri\text{-}4$ constitute an electronic hybrid of the type disclosed in U.S. Pat. No. 3,824,344 issued to Dennis B. James and James R. McEowen on July 16, 1974. This hybrid separates the directions of transmission from the telephone set into two separate paths, i.e., the transmit path from the output of amplifier $Ai\text{-}1$ and the receive path from the output of amplifier $Ai\text{-}2$.

The purpose of the monobus circuit is to recombine the two transmission paths onto a single wire while at the same time maintaining four-wire transmission, i.e., separate and distinguishable channels for received and transmitted signals. This is accomplished by separating the directions of transmission as voltage signals or current signals on the same wire.

In order to establish a conference, several ports are connected to a bus which is terminated by resistor R4. Each port presents a high impedance to the bus and consists of a current source and a voltage amplifier. A signal voltage at the base of transistor $Qi\text{-}1$ appears at the emitter of transistor $Qi$-2 as voltage $e3$. This results in a signal current applied to bus B1 having a value of $e3/BRi$-3.

If resistor R4 is made equal to resistor $BRi$-3 a resultant signal, $es$, equal to $-e3$ appears on the bus across resistor R4. The total current through resistor R4 at any time is the sum of the contributions from all ports. Thus, $es$ is equal to the negative of the sum of the $e3$'s voltage from each port. In this manner each port transmits a signal to the bus as a signal current.

Transmission from the Bus to a Line

Operational amplifier $Ai$-1 and associated components, $Ri$-3, $Ci$-2, $BRi$-1 and $BRi$-2, form the voltage amplifier for the receive path. This amplifier senses bus signal voltage and delivers it to the port hybrid. Resistor $BRi$-2 serves to cancel out the port's own contribution to signal $es$, so that signal $e2$ comprises those signals contributed by other ports. Resistor $BRi$-2 is connected from the bus to the virtual ground at the input node of amplifier A1-1 and thus the impedance seen looking into the port from bus B1 is $BRi$-2 in parallel with the composite collector impedance of transistors $Qi$-1 and $Qi$-2. This impedance is approximately equal to the value of resistor $BRi$-2. If resistor $BRi$-2 is much larger than resistor R4, the signal levels are not noticeably affected as new ports are added to a conference. Thus, using the monobus technique just described, many ports can be added to a conference with low loss.

DC Voltage Protection

Capacitor $Ci$-2 breaks the dc feedback loop in the port circuit insuring low frequency stability and a low offset voltage in amplifier $Ai$-1. In addition, if a pure resistance is used for resistor R4, the dc voltage on bus B1 varies with the number of ports since each port draws dc as well as signal current through resistor R4. Capacitor $Ci$-2 also prevents the dc bus voltage from saturating amplifier $Ai$-1.

Stability for Conferencing

The stability of large conferences can be improved by adjusting the ratio of resistor $BRi$-2 to resistor R4. By lowering this ratio the bus is loaded down in a controlled manner as new ports are added to a conference, by the paralleling of the $BRi$-2 resistors with resistor R4, thereby giving a lower effective value of resistor R4. This lowers the ac gain and injects negative feedback in increments as more ports are added to the conference. For instance, if the ratio of resistor BR1-2 to resistor R4 is 25, then the gain is reduced approximately 0.4 dB for each new port added.

Variable Resistance Crosspoint

A crosspoint XP1-0 which has a nonzero resistance will make the currents flowing through resistors BR1-1 and BR1-2 different because of the voltage drop across crosspoint XP1-0 and hence imperfect cancellation results, leading to gain changes in the monobus and also modifying the return loss. Although impedance mismatch is usually present in the system, we would like to control the effects due to crosspoint resistance variation. By using an extra crosspoint per port, the gain contrast is reduced and the return loss of the system is made independent of the crosspoint resistance variation.

Double Crosspoint Circuit

Figure 1:
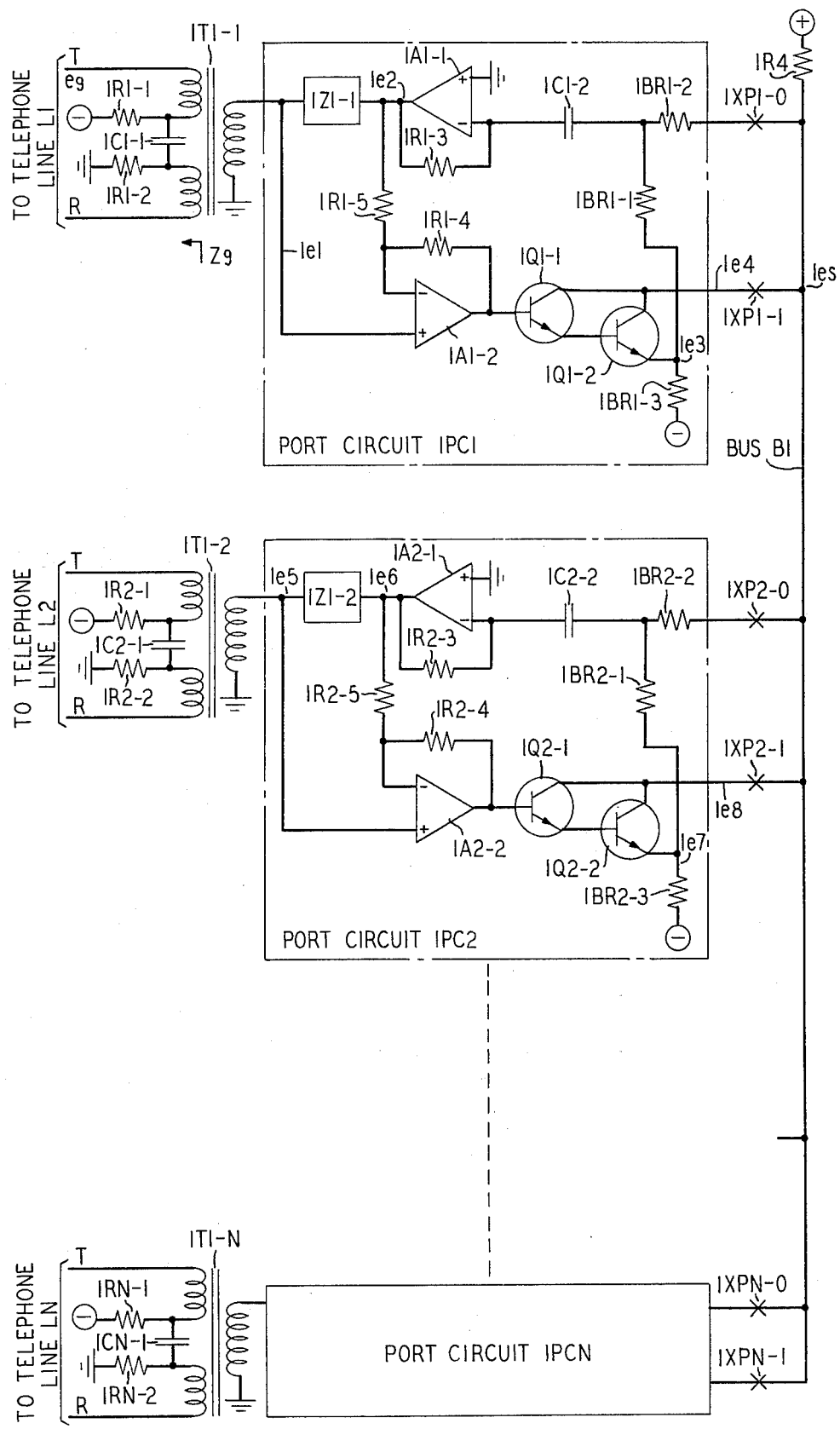
FIG. 1 shows a dual crosspoint switching matrix associated with a single bus.

The basic connection of the double crosspoint port circuits is shown in FIG. 1. The port circuits 1PC1 and 1PC2 are connected to a common bus B1 through crosspoints 1XP1-0, 1XP1-1, 1XP2-0, and 1XP2-1. In this new configuration near perfect cancellation results because the voltage drop across crosspoint 1XP1-1 does not affect the voltage drop across resistor 1R4 and the voltage drop across crosspoint 1XP1-0 is negligible since the resistance of resistor 1BR1-1 is very much greater than the resistance of crosspoint 1XP1-0. With perfect cancellation the configuration gives rise to transmission gains and return losses identical to that of the single crosspoint configuration with zero resistance crosspoints.

Analysis

Referring to FIG. 2, with a nonzero crosspoint resistance and a mismatch, the received signal at port circit PC2 can be expressed as $$e4 = \frac{eg}{2} \left\{ \frac{\frac{R4}{BR1-3}(1-\rho^2)}{\left[1+\left(1-\frac{rs+R4}{BR1-3}\right)\rho\right]^2 - \left[\frac{R4}{BR1-3}\rho\right]^2} \right\}, \quad (1)$$

where $$\rho = \frac{Zg-Z1-1}{Zg+Z1-1},$$

and $rs$ is the crosspoint resistance. Similarly, the return signal at port circuit PC1 can be expressed as $$e2 = eg \frac{(1-\rho)\left\{\frac{\Delta r}{(BR1-3)} + \rho\left[\left(\frac{R4}{BR1-3}\right)^2 - \left(\frac{\Delta r}{BR1-3}\right)^2\right]\right\}}{\left(1-\rho\frac{\Delta r}{(BR1-3)}\right)^2 - \left(\rho\frac{R4}{(BR1-3)}\right)^2}, \quad (2)$$

where $\Delta r = R4 + rs - BR1-3$ is the amount of crosspoint resistance variation. The value of BR1-3 is chosen to be $R4 = rsn$ in this circuit, where rsn is the nominal crosspoint resistance.

From equations (1) and (2), it can be seen that when $\rho = 0$, $rs = 0$ and $\Delta r = 0$, i.e., when the system has a perfect impedance match and the crosspoint has zero on-resistance, then we have $BR1-3 = R4$ and $$e1 = \tfrac{1}{2} eg,$$

$$e2 = 0.$$

Hence, the system is transparent and return loss is infinite, as expected.

With nonzero $rs$, $\Delta r$ and $\rho$, the system will have gain contrast, return loss and transmission loss problems. By using an extra crosspoint per port, we can have a different feedback arrangement as shown in FIG. 1. With this feedback arrangement, the gain contrast, return loss and transmission loss properties of the system will be improved.

Physically, this can be explained in the following way. From FIG. 1 we see that the constant current source resistor 1BR1-3 is made equal in value to resistor 1R4, the bus resistor. Hence, the signal appearing across resistor 1R4 equals $-1e3$. This is different from the arrangement shown in FIG. 2 where the voltage across R4 is the output of the transistor pair Q1 multiplied by the resistance ratio R4/BR1-3 (where $BR1-3 = R4 + rsn$). When this signal is transmitted to the other port, we see that in FIG. 1, in the feedback path the crosspoint is in series with resistor 1BR1-2. The value of 1BR1-2 is 100 k$\Omega$, while the on-resistance of a crosspoint is around 100 $\Omega$. Therefore, the crosspoint variation is absorbed by the very large 1BR1-2, and therefore nearly complete cancellation occurs at the input of amplifier 1A1-1. The gain contrast is reduced because the variation in rs will have a very small effect on $rs +$ 1BR1-2. For the same reason, since the feedback cancellation is not affected much by rs variation, the return loss will become independent of rs variation. Transmission loss will also be reduced because the ratio rs/1BR1-1 is very small.

Mathematically, this can be verified as follows. From FIG. 1, we have $$le1 = eg \frac{1-\rho}{2} + le2 \frac{1+\rho}{2},$$

$$le2 = -\left[le3 + le5 \frac{(lBR1-2)}{(lBR1-2)+rs}\right],$$

$$le3 = 2(le1) - le2,$$

$$le5 = -le3 - le7,$$

$$le7 = 2(le5) - le6,$$

$$le6 = -\left[le7 + le5 \frac{(lBR1-2)}{(lBR1-2)+rs}\right],$$

$$le5 = \frac{1+\rho}{2}(le6).$$

Combining these equations, we have $$le5 = \frac{eg}{2}(1-\rho^2) \frac{1}{1-\rho^2 + \frac{rs}{(lBR1-2)}(1+\rho)^2}, \quad (3)$$

and $$le2 = eg \frac{(1-\rho)^2}{1-\rho^2 + \frac{rs}{(lBR1-2)}(1+\rho)^2} \left[1 - \frac{(lBR1-2)+rs}{(lBR1-2)} + \frac{\rho}{1+\rho}\right]. \quad (4)$$

Equations (1), (2), (3) and (4) can be used to show the improvement in gain contrast, transmission loss, and return loss of the system.

Assuming that a $-12$ dB ($\rho = 0.25$) impedance mismatch exists in the system, and assuming that the crosspoint on resistance $rs = 100 \pm 60$ $\Omega$, then, for the worst case the gain contrast for a single crosspoint is 0.91 dB and for a double crosspoint is 0.0175 dB. The transmission loss for a single crosspoint is $-2.2$ dB and for a double crosspoint is $-0.023$ dB, while the return loss for a single crosspoint is $-12.9$ dB and for a double crosspoint is $-14.2$ dB.

From the above results, it is seen that improvements in gain contrast, transmission loss and return loss of the system can be obtained by using a double crosspoint connection to a monobus high impedance port circuit interconnection scheme.

Conclusion

In a typical key telephone system, the gain contrast requirement for line-to-line conversation is 0.5 dB at 1 kHz. With the single crosspoint feedback arrangement, the 0.91 dB gain contrast will not meet the requirement. The double crosspoint scheme described herein can ease this problem. The total number of crosspoints in the system can be reduced if extra crosspoints are used only for those line ports which are vulnerable to the gain contrast problem.

It should be understood that the use of two crosspoints per port circuit does not affect the operation of the bilateral monobus circuit taught in the above-mentioned Morgan-Smith patent application, but rather serves to expand the usefulness of such a port circuit. For example, single crosspoint and dual crosspoint circuits can be used in conjunction with the same monobus; the dual crosspoint circuit being associated with those lines which are vulnerable to gain contrast problems. Such an arrangement would serve to reduce the number of crosspoints needed in the system. Also it will be obvious that this invention can be used with the balanced transmission arrangement shown in the Morgan-Smith application as well as with the unbalanced transmission arrangement shown in the drawing.

What is claimed is:

1. An interface circuit for use in a switching system where any number of telephone communication lines can be connected together for transmission purposes, one said interface circuit being interposed between each telephone line and a first common bus said first common bus including a summing impedance shared in common by any interface circuit connected to said first common bus, each said interface circuit including first output current signal means operable for communicating to said summing impedance output current signals representative of input voltage signals from said associated telephone line; said communicated output current signals thereby being convertible into bus voltage signals by said bus summing impedance, means for applying any converted bus voltage signals to the telephone line associated therewith, means for subtracting from said applied converted bus voltage signals any portion of said bus voltage signals representative of input voltage signals received over said associated telephone line, first connecting means, including said output current signal means for becoming connected to said common bus, and second connecting means including said converted bus voltage signal applying means, and separate from said first connecting means, for becoming connected to said common bus.

2. The invention set forth in claim 1 wherein said first current output signal means includes at least one high impedance current source connectable to said bus.

3. A port circuit for interconnecting two or more multiwire telephone lines over a common bus, one said port circuit associated with each said telephone line and interposed between each said associated line and said common bus, said common bus including means for converting current signals applied thereto into common bus voltage signals, each said port circuit including means including a multielement resistive circuit arranged to produce output current signals representative of voltage signals present on said associated telephone line, means including at least a first element of said multielement circuit for applying any said produced output current signals to said common bus, means including at least a second element of said multielement circuit for applying any said common bus voltage signals to said associated telephone line, means including at least a third element of said multielement circuit for subtracting from said common bus voltage signals any portion of said common bus voltage signals converted from output current signals which were produced from said port circuit, first connecting means, including said output current signal applying means, for becoming connected to said common bus, and second connecting means, including said common bus voltage signal applying means, and separate from said first connecting means for becoming connected to said common bus.

4. The invention set forth in claim 3 wherein said output current signal means includes at least one high impedance current source.

* * * * *

UNITED STATES PATENT AND TRADEMARK OFFICE
CERTIFICATE OF CORRECTION

PATENT NO. : 3,991,280
DATED : November 9, 1976
INVENTOR(S) : Dennis B. James, Chao Kai Liu and Robert M. Smith It is certified that error appears in the above-identified patent and that said Letters Patent are hereby corrected as shown below:

Column 4, line 30, "circit" should read --circuit--; column 4, equation (2) now reads $$"e2 = eg \frac{(1-\rho)\left\{\frac{\Delta r}{(BR1-3)} + \rho\left[\left(\frac{R4}{BR1-3}\right)\right]^2 - \left(\frac{\Delta r}{BR1-3}\right)^2\right]\right\}}{\left(1 - \rho \frac{\Delta r}{(BR1-3)}\right)^2 - \left(\rho \frac{R4}{(BR1-3)}\right)^2} , \qquad (2)"$$

should read $$--e2 = eg \frac{(1-\rho)\left\{\frac{\Delta r}{(BR1-3)} + \rho\left[\left(\frac{R4}{BR1-3}\right)^2 - \left(\frac{\Delta r}{BR1-3}\right)^2\right]\right\}}{\left(1 - \rho \frac{\Delta r}{(BR1-3)}\right)^2 - \left(\rho \frac{R4}{(BR1-3)}\right)^2} , \qquad (2)--$$

Signed and Sealed this

Twenty-second Day of February 1977

[SEAL]

Attest:

RUTH C. MASON
*Attesting Officer*

C. MARSHALL DANN
*Commissioner of Patents and Trademarks*

Dedication 3,991,280.—*Dennis Bryan James*, Rumson, *Chao Kai Liu*, Matawan, and *Robert McKee Smith*, Holmdel, N.J. MONOBUS VARIABLE RESISTANCE TRANSMISSION CIRCUIT. Patent dated Nov. 9, 1976. Dedication filed July 14, 1978, by the assignee, *Bell Telephone Laboratories, Incorporated*.

Hereby dedicates to the Public the entire term of said patent.

[*Official Gazette September 5, 1978.*]